S. CAREY.
PAVING BLOCK.
No. 1,966.   Patented Feb. 3, 1841.
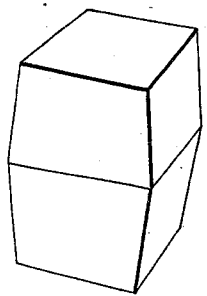
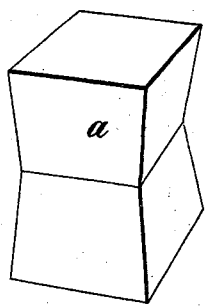
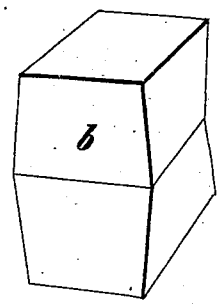
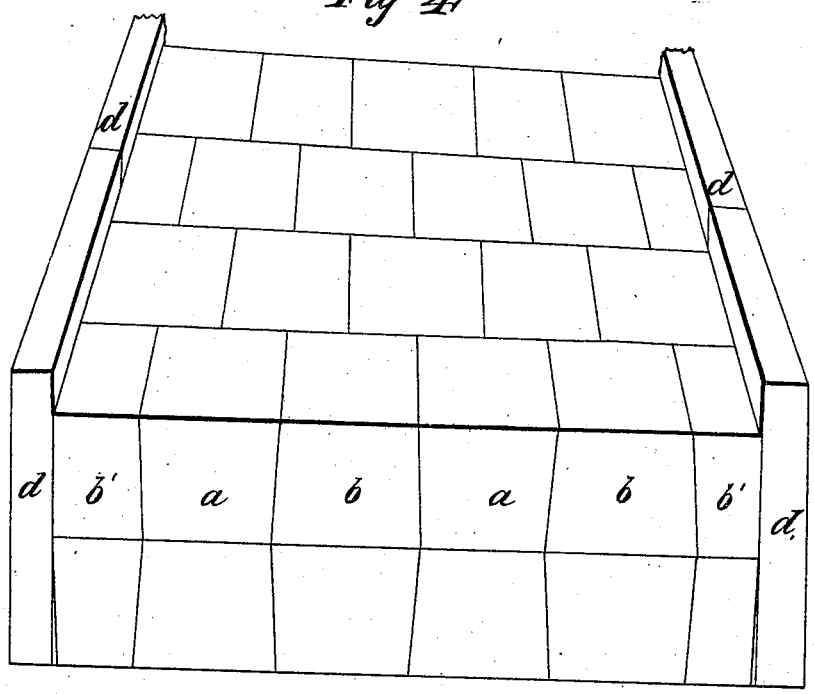

UNITED STATES PATENT OFFICE.

STEPHEN CAREY, OF NEW ORLEANS, LOUISIANA.

MANNER OF FORMING BLOCKS OF WOOD FOR PAVING STREETS, ROADS, &c.

Specification of Letters Patent No. 1,966, dated February 3, 1841.

*To all whom it may concern:*

Be it known that I, STEPHEN CAREY, of the city of New Orleans, in the State of Louisiana, have invented an improvement in the manner of forming blocks of wood for the construction of pavements for roads, streets, and other places where such pavements may be required, by which mode of forming said blocks each individual block is made to sustain and is sustained by those which surround it independently of the substratum or foundation upon which said blocks rest; and I do hereby declare that the following is a full and exact description thereof.

In forming my blocks for paving, I first cut them rectangularly, taking squared timber, generally of from nine inches to a foot, more or less, on each side, which timber I cross cut into such lengths as may be thought suitable, according to the climate, and other circumstances; these lengths, varying, usually, from nine to sixteen inches, those of the greatest length being required in climates where the ground is subject to be frozen to a considerable depth.

The rectangular blocks, prepared as above described, are to be sloped, or beveled, on each of their four sides, said slopes, or bevels meeting at, or near, the middle of the length of each block; in consequence of which they become either wider, or narrower, in their measurement across the middle of each of their faces than they are at their ends. In the preparing my blocks I give to them three different forms, these being all that are necessary to their being combined together; one of these forms being that which would result from the uniting of two truncated rectangular pyramids by their larger ends; a second form is that which would be produced by joining such truncated pyramids by their smaller ends; and the third is a combination of the other two forms, two of its opposite sides having the first, and its other two sides the second form.

Figure 1, in the accompanying drawings, shows the first of these forms; Fig. 2, the second, and Fig. 3, the third. Fig. 1, is the largest in the middle in all directions; Fig. 2, the smallest in the middle in all directions, and Fig. 3, the largest in the middle in one direction, and the smallest in the other. Fig. 4, represents the manner of combining these blocks in forming a pavement; the respective blocks $a$, $b$, $a$, $b$, corresponding with those shown in Figs. 2, and 3; and the half blocks $b'$, $b'$, representing the terminations of the series, resting against a curbstone, $d$, $d$, or other sustaining abutment. The blocks in this figure are shown as arranged in a straight line across the road, but the surface may be made arched, or crowning, in any desired degree, the foundation on which they rest being prepared with that view. The series $a$, $b$, $a$, $b$, as shown in Fig. 4, will be concave on each side from curb to curb, and against them on either side will be a series consisting of blocks corresponding with Figs. 1, and 3, but with Fig. 3, so turned that its convex side shall be against the sides of the range shown at $a$, $b$, $a$, $b$, in Fig. 4; the blocks Figs. 1, and 3, being made to alternate with each other. Another series, like those of $a$, $b$, $a$, $b$, Fig. 4 is then laid against these, and so on until the work is completed.

The degree of slope given to the sides of the blocks may be varied, but I have found that about an eighth of an inch in every inch is, for most purposes, a good proportion; and this in a block of twelve inches in length will cause the diameter in the center to be an inch and a half greater, or less, than that of the ends, dependent upon the concavity, or convexity, of the block. Where the blocks are increased in length, the slope may be diminished, and where they are short it may be increased, all which must be left to the judgment of the constructor.

The manner of forming my blocks will admit of some variation, while the general principle is still adopted; thus, for example, the blocks may be left plane on two opposite sides, those faces only which come into contact in crossing the road, from curb to curb, being alternately convex and concave. The blocks in each series crossing the street would then mutually support each other, but the respective rows would merely bear against each other by their plane surfaces, or flat sides, in the manner of cubical blocks.

Having thus, fully described the manner in which I form and combine my blocks for the construction of pavements, what I claim as constituting my invention, and desire to secure by Letters Patent, is—

The giving to their sides, where they come into contact with each other, concave and convex faces, alternately, in the manner herein fully set forth, by which mode of forming and combining them they are each supported by, and aid in supporting, the surrounding blocks, as described, it being distinctly understood that when one side of a block is convex, its opposite side is so likewise, and vice versa.

STEPHEN CAREY.

Witnesses:
 THOS. P. JONES,
 JOS. ANDREWS.